United States Patent
Koelle

[11] 3,854,792
[45] Dec. 17, 1974

[54] FIBER OPTIC SECURITY SEAL

[75] Inventor: Alfred R. Koelle, Los Alamos, N. Mex.

[73] Assignee: The United States of America as represented by the Atomic Energy Commission, Washington, D.C.

[22] Filed: Mar. 22, 1973

[21] Appl. No.: 343,988

[52] U.S. Cl. .................. 350/96 B, 70/440
[51] Int. Cl. ............................ G02b 5/16
[58] Field of Search ........... 350/96 R, 96 B; 70/440

[56] References Cited
UNITED STATES PATENTS

| | | | |
|---|---|---|---|
| 3,227,535 | 1/1966 | Woodcock | 350/96 B X |
| 3,238,837 | 3/1966 | Woodcock | 350/96 B |
| 3,265,584 | 8/1966 | Cooper | 350/96 B X |
| 3,466,928 | 9/1969 | Kind | 350/96 B X |
| 3,489,482 | 1/1970 | Brill | 350/96 B |
| 3,702,275 | 11/1972 | Hooker | 350/96 B X |

Primary Examiner—David H. Rubin
Attorney, Agent, or Firm—John A. Horan; Paul D. Gaetjens; Robert W. Weig

[57] ABSTRACT

A fiber optic security seal as disclosed herein. The fibers at one end of a fiber optic bundle preferably comprising randomly distributed fibers are secured relatively stationary to one another. The bundle is passed through receiving means for sealing a container or other such item. The receiving means can comprise metal loops or straps or an orifice such as those through which seals are typically passed. The fibers at each end of the bundle are optically terminated and are fixed relative to one another by a securing means large enough so that it cannot be pulled through the receiving means. One end of the bundle is masked and illuminated so as to produce a particular output light pattern at the other end of the bundle. This output light pattern is recorded. The seal may be checked again and again, as desired, by illuminating the masked end, and checking the light pattern at the other end for compliance with the record.

5 Claims, 5 Drawing Figures

PATENTED DEC 17 1974　3,854,792

3,854,792

FIBER OPTIC SECURITY SEAL

The invention described herein was made in the course of, or under, a contract with the U.S. ATOMIC ENERGY COMMISSION.

FIELD OF THE INVENTION

The invention relates to a security seal and more particularly to a fiber optic security seal.

BACKGROUND OF THE INVENTION

Typical prior art security seals are metal tapes embossed with identification numbers and sealed with special clasps, wire loops, or moldable material such as lead or plaster, carrying identifiable impressions. These seals are generally effective, but they are not tamperproof. They can also easily be counterfeited. In addition, few of such seals are reusable or recodable.

SUMMARY OF THE INVENTION

In accordance with the invention, there is provided a preferably reusable and recodable fiber optic security seal R. 312. A fiber optic bundle passes through receiving means such as holes in a container or metal straps affixed thereto. The fibers at each end of the bundle are optically terminated and fixed relative to one another by securing means large enough so that they cannot be pulled through the receiving means without breaking the means or the seal itself. One end of the bundle is masked and illuminated. Light, as modulated by the mask, produces a particular pattern at the other or output end of the bundle. The output light pattern is preferably different from that at the masked or input end due to a random or other distribution of the fibers in the bundle. This output light pattern is recorded. The light output pattern can be checked from time to time, such as at various points in transit of a container sealed in accordance with the invention, to see if the seal has been tampered with or broken. The check is accomplished by applying illumination to the input end of the seal through the input mask and comparing the output light pattern to the record.

One object of the invention is to provide a tamperproof fiber optic security seal.

Another object of the invention is to provide a reusable, recodable security seal.

Still another object of the invention is to provide a security seal resistant to a wide variety of hostile environmental factors.

One advantage of the present invention is that the seal thereof is tamperproof.

Another advantage of the invention is that the seal thereof is reusable and recodable.

Yet another advantage of the security seal of the invention is that it is simple to use.

BRIEF DESCRIPTION OF THE DRAWINGS

Other objects and advantages of the present invention will be apparent to those skilled in the art from the following description with reference to the accompanying drawings wherein like numbers denote like parts and wherein.

DETAILED DISCLOSURE OF THE INVENTION

Figure 1:
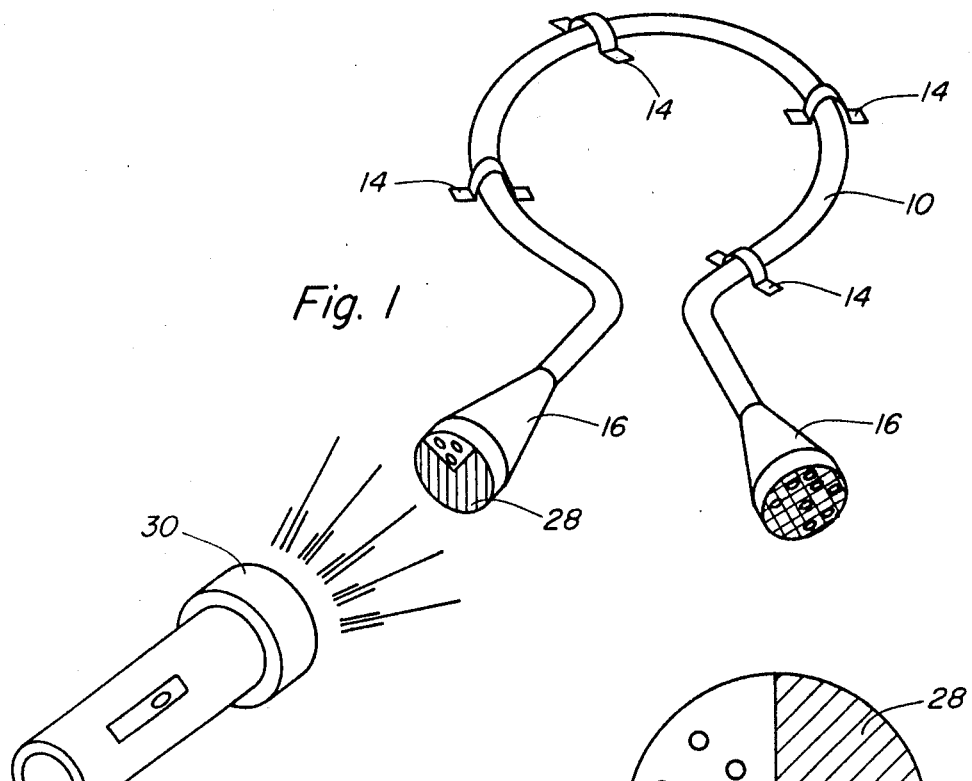
FIG. 1 shows a perspective view of a security seal in accordance with the invention.

FIG. 1 shows a security seal 10 in accordance with the invention comprising a fiber optic bundle or "rope" 12 passed through sealing loops 14 on a container or package (not shown). Seal 10 can also be passed through other receiving means such as orifices, metal straps or the like. Fibers comprising the bundle 12 are preferably randomly distributed but may be ordered in some predetermined fashion, if desired. The ends of the bundle 12 are optically terminated to allow exposure of the ends of individual fibers. Random distribution of the fibers in the bundle causes the fiber ends at one end of the bundle to have no corresponding coherent or predictable pattern at any other point along the length of the bundle. Thus, each fiber independently carries its own light from its location at the sending end of the bundle to an unpredictable location at the other end of the bundle.

Figure 4:
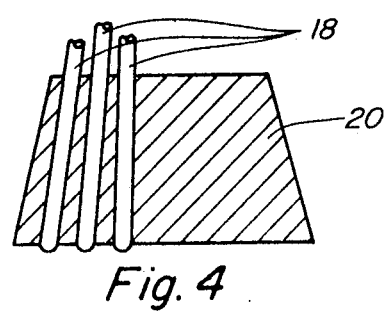
FIG. 4 shows how the fibers in either one or both of the ends of the fiber bundles comprising the securing seal of the invention may be spread and fixed relative to one another with a potting compound.
Figure 5:
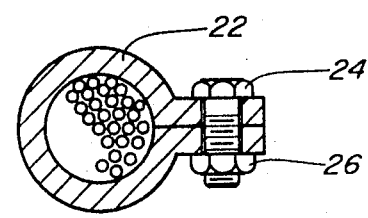
FIG. 5 shows how the fibers in either one or both of the ends of the fiber optic seal of the invention may be fixed relative to one another with a circumferential clamp.

Means for securing the fibers relative to one another, such as shown in FIGS. 4 and 5 hereinafter to be discussed, are represented by fiber end securing or fixing means 16. One criterion for the fiber end securing means is that it provide an enlarged crosssection incapable of being drawn through receiving means such as loops 14 without breaking any of the fibers or disturbing their fixed orientation with respect to one another at the ends of the bundle. Enlargement of spreading of the ends also serves to provide a larger working area for easier reading of the seal.

Another criterion for the fiber end securing means is that it be capable of retaining the fibers at the ends of the bundle in mutually fixed disposition relative to one another during normal handling of the sealed container, package, or the like, in question. The securing means should also be highly resistant to other hostile environmental factors such as fluctuating temperatures, humidity, and inadvertent rough handling.

Exemplary embodiments of the fiber bundle end securing means are shown in FIGS. 4 and 5. FIG. 4 shows individual fibers 18 spread and embedded in a potting compound 20 such as plastic, lead, epoxy, or the like.

FIG. 5 shows a circumferential clamp 22 providing an enlarged cross-section incapable of being pulled through a receiving means such as a loop 14 without destroying the receiving means or disengaging the clamp from the bundle which would allow the fibers to redistribute themselves revealing tampering, as hereinafter to be explained. The clamp 22 is shown held in place by a bolt 24 and nut 26. Too, funnel-shaped guide holes and a faceplate having a grid or waffle pattern of holes can be used as a securing means. Such plates offer the advantages of restricting the fibers from any movement once the fibers are positioned and of providing large input and output surfaces to facilitate easier readin and readout. The grid on a clamp on an output end of a seal in accordance with the invention can be keyed to a readout grid. Other suitable fiber end securing devices will be apparent to those skilled in the art.

One advantage of using a clamp on either one or both ends of the bundle is that it provides a reusable seal, thereby adding to the economy of the security seal of the invention. Of course, one end may be set in potting compound and the other end clamped, still allowing the seal to be reused. If both ends are set in potting compound, the seal can still be reused a number of times by simply cutting the fibers directly behind one or both of the potted ends. Repeated cutting will, of course, shorten the length of the bundle, until eventually the seal is too short for use and should be thrown away.

Figure 2:
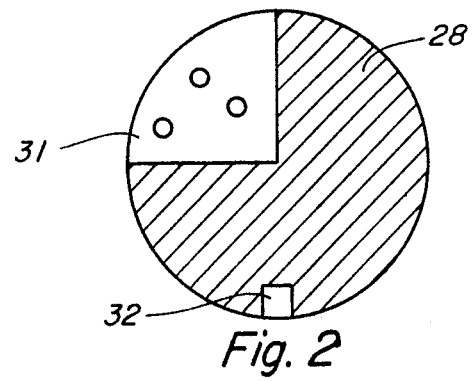
FIG. 2 is an enlarged showing of an input mask for use with the security seal of FIG. 1.

After the security seal is appropriately passed through the receiving means and the ends of the fibers are fixed relative to one another by securing means such as those shown in FIGS. 4 and 5, one end, and it does not matter which one, is covered with a faceplate or mask 28 or similar device such as shown in FIG. 2. The faceplate 28 can be made of plastic, glass, paper, metal, or the like. The opaque region provided by the faceplate masks light from a source of illumination such as a flashlight 30 shown in FIG. 1. One segment 31 of the end of the bundle 10 is unmasked so that light from a suitably positioned source will always pass through the fibers having ends in this region. An index 32 such as a notch or nob can be provided in the potting compound or on the clamp. Thus, the mask can repeatedly be disposed over the end of the bundle in a selected position. Of course, the mask is not limited to the embodiment shown, but may comprise any desirable pattern of opaque and transparent, translucent or partially transparent portions. In addition, an illumination passing segment of a mask may comprise one or more polarizing filters, variously colored transparent portions or other such light-modulating devices.

The index 32 on the input end of the fiber optic bundle may alternatively be a few fibers touched with paint or otherwise identifiably marked.

Figure 3:
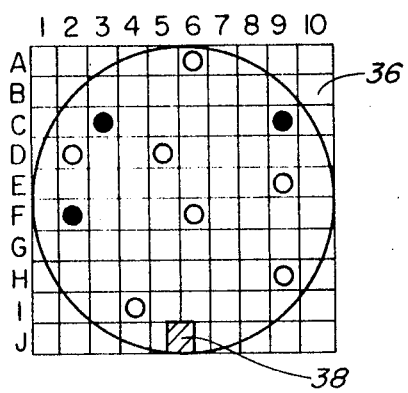
FIG. 3 is an enlarged showing of a readout template for use with the security seal of FIG. 1.

Light emerging from the other or output end of the bundle, as modulated by mask 28, forms a random pattern of light because of the above described random distribution of the fibers in the bundle. Of course, one may arrange or intertwine the fibers in a predetermined manner. The output light pattern can be "read" into a transparent grid laid over the terminal face. The grid may be provided with a color or otherwise coded key 38 for easy reference when repositioning the grid. Key 38 can alternatively be a notch, nob, or painted area similar to index 32. Too, index 32 could be a transparent red area, thereby providing a red output area or areas to which grid 36 could be keyed. FIG. 3 shows a 10 × 10 grid but a grid of any desirable size or shape, preferably keyed for ease of use, can be utilized.

The location of the illuminated fibers at the output end of the bundle can be encoded for recording as shown in FIG. 3. For example, A6, D2, D5, E9, F6, H9, and I4 are illuminated whereas C3, C9, and F2 represent unilluminated ends. Too, as stated above, some of the fibers may be color coded with an input mask comprising colored transparent areas.

In operation, one selects a fiber optic bundle of suitable length for the application anticipated. One end would normally be assembled by a clamp or in a mold with potting compound as shown in FIGS. 4 and 5. One passes the bundle through an appropriate receiving means and clamps or sets the other end with potting means. After the compound sets or securing the compound, the user makes one of the two ends and places a readout grid over the other. An appropriate index area may be disposed on the masked end. A key is preferably provided for the grid. One places a grid over the output end of the bundle in accordance with the key and records the locations of the illuminated fibers at the readout end of the seal. If using color coding or polarizing filters, one records the color and polarization of illuminated fibers at the output.

At a location or locations where the seal is to be checked, an inspector places a mask similar to that provided over the input end of the seal. Alternatively, the original mask may be left on the seal. The inspector locates the mask in accordance with the index, if an index is provided, and illuminates the input (masked) end. The inspector then locates a transparent grid in accordance with the key on the output end of the seal and compares the readout illumination pattern seen through the transparent grid to a record of the original pattern. The discrete locations of illuminated fibers within the grid can easily be classified by writing them down in terms of two coordinates. Such coordinates are easily communicable by telegraph, telephone, or other form of cummunication to inspectors along the route of a container sealed in accordance with the invention.

Because coding information can be communicated verbally by telephone or other voice communication, an inspector at any location where the seal is checked could communicate the pattern of illuminated fiber ends on the seal to a monitoring office, where a determination can be made as to whether or not the code "checks." This removes the necessity of having to thrust the judgment, reliability, and loyalty of the inspector, who need not be given knowledge ahead of time what the code should be.

Different masks can be used with the same assembled seal in order to produce different patterns of illuminated fiber ends at the readout end of the seal. By giving each inspector a different interrogating mask from a plurality of masks, each inspector would have a different code to report. This would minimize the likelihood of successful collusion in faking a safe status report by an inspector.

One can incorporate some optically inert fibers in the bundle along with those that do transmit light. For a seal of a particular size or number of fibers, one may desire to establish an optimum ratio of inert and transmitting fibers to provide a practical number of illuminated fibers for readout. The more fibers one uses in the bundle, the greater the degree of randomness obtainable. Too, the more fibers in the bundle, the more difficult it is for someone to manipulate a disassembled bundle to get a predetermined pattern. Inert fibers can be made so that they cannot be distinguished from the active ones by mere visual inspection. For example, ordinary nylon monofilament fishing line appears indistinguishable from plastic light transmitting fibers to the naked eye.

Since a relatively small number of fibers are usually illuminated, readout can be rapidly accomplished.

Typically, the seal is read by eye. However, an automatic reader-comparator camera could be utilized to further simplify use of the security seal of the invention.

Counterfeiting the seal of the invention should be practically impossible because of the random fiber distribution and readout pattern, even though the pattern on the mask originally used to encode the seal is known. It would be extremely difficult to duplicate in detail the output light pattern of hundreds of randomly distributed fibers.

The invention has been described in detail with particular reference to preferred embodiments thereof, but it will be understood that variations and modifications can be effected within the spirit and scope of the invention.

I claim:

1. A security seal installable through a seal receiving means comprising:
 a fiber optic bundle passable through said seal receiving means; first means for securing all fibers in said bundle in fixed relation to one another at one end of said bundle, said first securing means being of a configuration incapable of being passed through said receiving means;
 second means for securing all fibers in said bundle in fixed relation to one another at the other end of said bundle, said second securing means being of a configuration incapable of being passed through said receiving means;
 said fibers in said bundle being randomly distributed such that the relative position of said fibers is different at each cross-section along the length of said bundle; and
 means for masking one of said ends so that upon illumination of said one end, a pattern of illuminated fiber ends appears at said other end.

2. The invention of claim 1 wherein at least one of said first and second securing means comprises means for spreading said fibers so as to provide a cross-sectional area for at least one of the ends of the fiber bundle larger than interim cross-sectional areas of said bundle.

3. The invention of claim 1 further comprising means for indexing said masking means to said one end.

4. The invention of claim 1 further comprising means for encoding the positions of the ends of the illuminated fibers at said other end of the bundle.

5. The invention of claim 4 further comprising means for keying said encoding means to said other end of the bundle.

* * * * *